May 14, 1968 N. GOLD ETAL 3,382,782

PHOTOGRAPHIC EXPOSURE AND PROCESSING APPARATUS

Filed April 25, 1966 2 Sheets-Sheet 1

INVENTOR
Nicholas Gold
and
Paul B. Mason
BY
Brown and Mikulka
and
Robert E. Corb
ATTORNEYS INVENTOR
Nicholas Gold
and
Paul B. Mason
BY
Brown and Mikulka
and
Robert E. Corb
ATTORNEYS United States Patent Office 3,382,782
Patented May 14, 1968

3,382,782
PHOTOGRAPHIC EXPOSURE AND PROCESSING APPARATUS

Nicholas Gold, Arlington, and Paul B. Mason, Magnolia, Mass., assignors to Polaroid Corporation, Cambridge, Mass., a corporation of Delaware Filed Apr. 25, 1966, Ser. No. 544,774
11 Claims. (Cl. 95—13)

ABSTRACT OF THE DISCLOSURE

Photographic apparatus for exposing and processing successive sections of a photosensitive sheet including an exposure system for exposing a variable area of the photosensitive sheet and a processing system coupled with the exposure system for controlling the length of the section in proportion to the length of the exposed area.

This invention relates to photographic apparatus for exposing and processing successive areas of a photosensitive image-recording sheet to produce visible images in said sheet and more particularly to apparatus useful for copying documents.

Photographic apparatus of the type comprehended by the present invention generally includes means for exposing successive areas of a light-sensitive, image-recording sheet to light from a subject, such as a document, page of a book, photograph, etc.; cutting the exposed, image-recording sheet into sections each including an exposed area; and treating each of the sections with a liquid processing agent to form a visible (positive) image of the subject. The exposure system of the apparatus generally comprises means for supporting successive sections of the photosensitive sheet in position for exposure, means for locating a subject in position for exposure, means for illuminating the subject, and an optical system including an objective lens for producing an image of the subject on the section of the photosensitive sheet positioned for exposure. The processing system includes means for severing each exposed section of the photosensitive sheet from the remainder of the sheet and applying a liquid processing agent to the exposed area of each section to effect visible image formation.

An object of the present invention is to provide in photographic apparatus of the type described, novel and improved means for varying the length of each area of the photosensitive sheet exposed to light from the subject, and processing means coupled with the means for exposing the photosensitive sheet for automatically varying the length of each section of the photosensitive sheet treated with a liquid in accordance with the length of the exposed area thereof.

Another object of the invention is to provide processing means of the type described including means coupled with the exposure means for automatically varying the lengths of the sections severed from the sheet so that each section has a length corresponding with the length of the exposed area thereof.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

Figure 1:
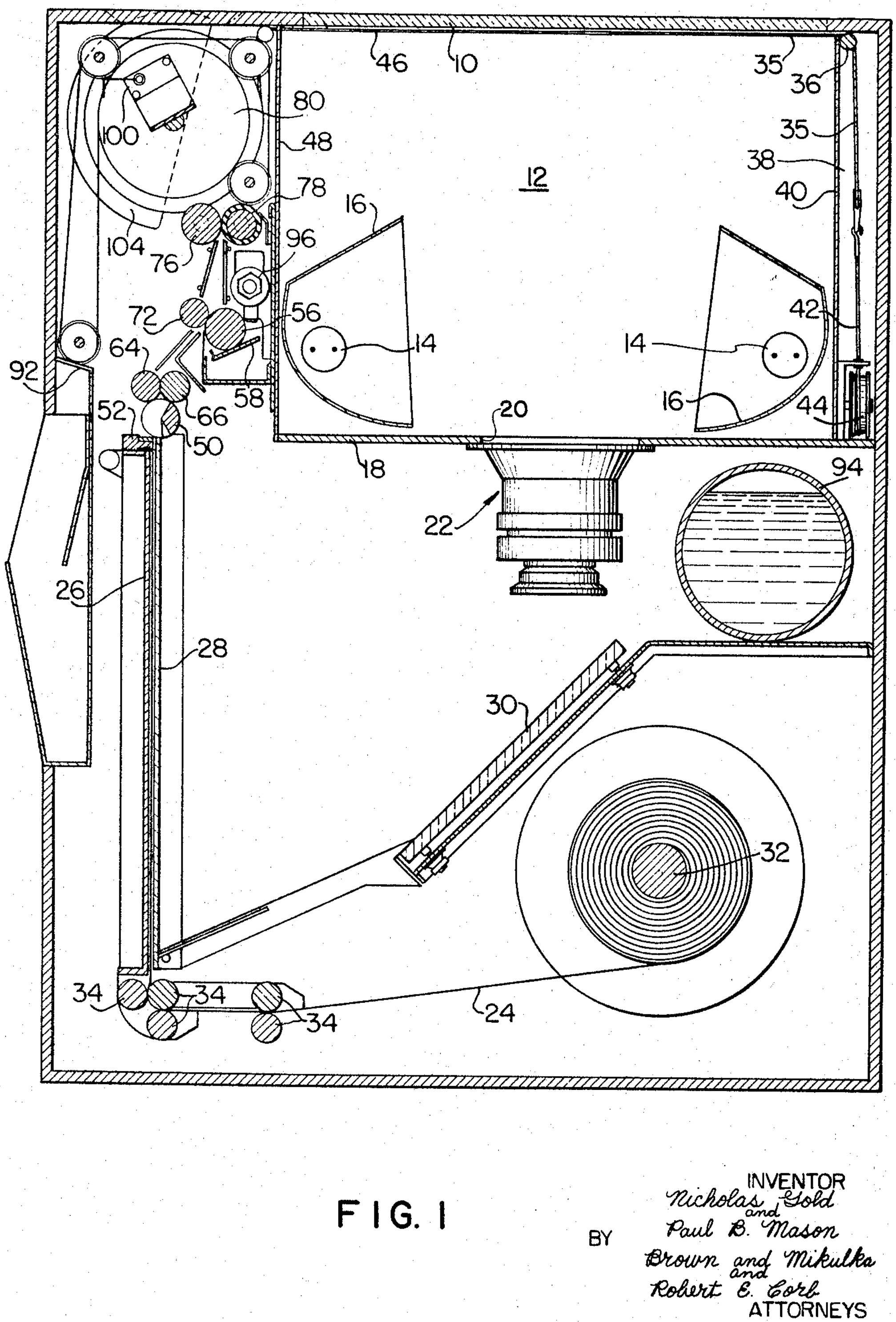
Figure 2:
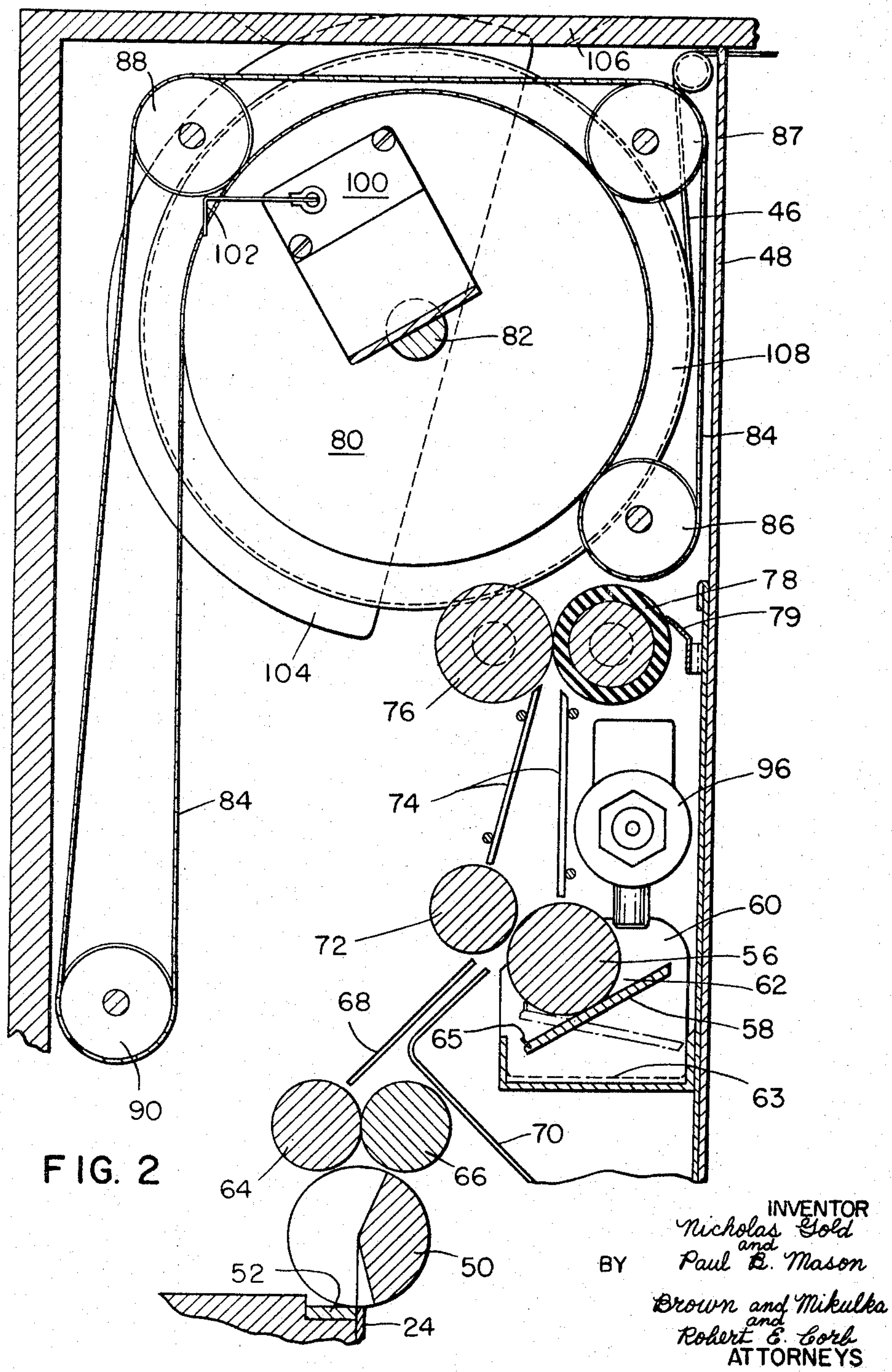

For a fuller understanding of the nature and objects of the invention, reference should be had to the following detailed description taken in connection with the accompanying drawings wherein:

FIGURE 1 is a sectional, elevational view of photographic document copying apparatus embodying the invention; and FIG. 2 is an enlarged sectional view of a portion of the apparatus illustrating the construction of the processing means.

The document copying apparatus of the invention is shown in FIGURE 1 as including an exposure system comprising a generally horizontal, transparent window 10 comprising the upper wall of a chamber 12 in which are mounted lamps 14 and reflectors 16 for illuminating an original document positioned for exposure on the upper surface of window 10. The chamber is defined by walls comprising the housing of the apparatus including a lower wall 18 provided with a centrally located opening 20 in which is mounted an objective lens and shutter assembly 22 of a conventional type employed in photography. The apparatus is primarily intended to photograph rectangular subjects and accordingly, window 10 is rectangular in shape having length and width dimensions corresponding to the largest document, e.g., 11 x 14 inches, usually reproduced.

Means are provided for supporting successive areas of a light-sensitive, image-recording sheet designated 24, in position for exposure to light from an original, positioned on window 10, transmitted by lens 22. These means include a generally planar support plate 26 mounted with a surface thereof in a vertical plane facing lens 22 and a transparent plate 28 located in juxtaposition with the surface of the support plate for holding successive sections of the image-recording sheet against the support plate. In lieu of transparent plate 28, a frame may be provided for engaging the section of the sheet to be exposed at the margins of the section for supporting it against plate 26. Mirror 30 is arranged substantially at a 45° angle with respect to the axis of lens 22 and the plane of support plate 26 for redirecting light from the lens toward the support plate and a section of the photosensitive sheet positioned thereon, and producing the geometric image reversal required for a correct copy of the original. Photosensitive sheet 24 is supplied coiled upon a spool 32 mounted beneath mirror 30 and is advanced from the spool upwardly between the support and transparent plates by a succession of driven feed rolls designated 34.

In a document copier designed to produce copies having a one-to-one size correspondence with the original, window 10 is at least substantially coextensive in size and shape with transparent plate 28 so that during each exposure, the entire area of the section of the photosensitive sheet located behind transparent plate 28 on support plate 26, is exposed to light reflected from objects, such as a cover, located outside of window 10. It is frequently desirable to produce copies of originals that are substantially smaller than window 10 and transparent plate 28 and this practice would normally result in exposure of the entire area of the sheet located behind plate 28 and substantial waste of the photosensitive sheet material. Provision is made in the document copier of the invention for varying the length of the area of the photosensitive sheet exposed in order to conform more approximately with the length of the original being copied, and thereby reduce wastage of the photosensitive sheet material. The means for controlling the length of the exposed photosensitive sheet comprise a curtain 35 movable to any position over a predetermined range of positions across the underside of window 10 within chamber 12 for obscuring a portion of the window and preventing exposure of the photosensitive sheet by light entering that portion of the window. Curtain 35 is mounted for movement over a support roll 36 mounted in the upper portion of a chamber 38 located at one end of chamber 12 and separated therefrom by a dividing wall 40, with the end portions of the curtain disposed within chambers 12 and 38 on opposite sides of support roll 36. The edge of curtain 35 within chamber 12 is substantially straight, is perpendicular to the direction of movement of the photosensitive sheet, and defines the end of the area of the photosensitive sheet that is exposed.

Curtain 35 is supported and moved by providing flexible cables attached to the opposite ends of the curtain. The end of the curtain within chamber 38 is attached to a cable 42, in turn, coupled with a drum 44, biased for rotation by a torsion spring tending to wind the cable about the drum and draw the curtain into chamber 38. Two cables 46 are coupled with the opposite end of the curtain at the lateral edges thereof and extend across chamber 12 closely adjacent the underside of window 10 through openings in an end wall 48 of the chamber where cables 46 are coupled with means for moving the cables to adjust the position of curtain 35.

Following exposure, the exposed section of sheet 24 located between plates 26 and 20 is advanced upwardly between a rotary knife 50 and anvil 52, into the processing section of the apparatus while another section of the photosensitive sheet is advanced upwardly between the two plates into position for exposure. When the exposed section of the photosensitive sheet has passed between the knife and anvil, the knife is rotated to sever this section of the sheet from the remainder of the photosensitive sheet located between the plates and movement of the photosensitive sheet by feed rolls 34 is discontinued. The severed section of the photosensitive sheet continues through the processing section of the apparatus where it is treated with a liquid preferably to produce a visible image.

In the processing section of the apparatus, a liquid processing composition is applied to one side of the exposed photosensitive sheet for permeation into the sheet to effect the formation of a visible image. The means for applying the processing liquid may take a number of different forms such as shown, for example, in the copending U.S. Patent Application of Richard J. Chen et al., Ser. No 456,423, filed May 17, 1965; or it may take the form shown in detail in FIGS. 1 and 2 of the drawings. the processing system shown and described herein is designed to apply a predetermined quantity of a non-viscous liquid to the exposed side of the photosensitive sheet, preferably to effect image formation by a silver halide diffusion transfer process. For examples of such processes and the materials useful therein, reference may be had to copending U.S. applications Ser. No. 368,622 of Edwin H. Land, and Ser. No. 368,621 of Edwin H. Land et al., both filed May 19, 1964. These applications describe a combination image-recording and image-receiving sheet comprising a support such as paper, at least one layer containing a light-sensitive material such as a silver halide emulsion, and an outer layer comprising a translucent material such as finely divided titanium dioxide dispersed in a suitable, permeable, colloidal carrier or matrix such as gelatin which is permeable to an aqueous processing liquid. The translucent pigment may be incorporated in the layer containing the light-sensitive material and/or may comprise a separate outer layer which may also contain silver precipitating nuclei and is sufficiently transparent to permit exposure of the light-sensitive layer therebeneath, while at the same time, being sufficiently opaque to provide the requisite background for a positive silver image transferred thereto by diffusion and to mask a negative image formed there under. Processing of the exposed image-recording sheet is accomplished by applying an aqueous liquid including a silver halide complexing agent to the side of the sheet opposite the support so as to impregnate the light-sensitive layer with sufficient processing liquid to produce a positive silver transfer image on the surface of the translucent layer.

The processing liquid may be non-viscous, i.e., have the viscosity of water, or it may include a film forming agent and range in viscosity from that of water to a viscosity of 200,000 centipoises at 20° C. The operation and construction of the liquid applicator will depend to a large extent upon the nature and viscosity of the liquid, but in any event, will be designed to apply the processing liquid to at least the exposed (rectangular) area of each section of the photosensitive sheet as the section is advanced through the processing section of the apparatus.

The means shown in this application for applying a non-viscous processing liquid to the sheet include a cylindrical applicator roll 56 mounted for rotation about a substantially horizontal axis, a plate 58 mounted intermediate its lateral edges beneath the applicator roll for pivotable movement about an axis substantially parallel with the axis of rotation of the applicator roll, and a pair of end members 60 for engaging the roll at the ends of the cylindrical portion thereof. Plate 58, in the operative position shown in FIGS. 1 and 2, is disposed with its upper surface tangent with the peripheral surface of the roll and cooperates therewith and with end members 60 to form a trough 62 into which may be introduced a predetermined quantity of processing liquid sufficient to treat a predetermined length of the photosensitive sheet.

Excess liquid may be disposed of and the applicator roll cleaned by pivoting plate 58 to the inoperative position shown in broken lines in FIG. 2 to dump the excess liquid into a container 63 provided beneath the plate for this purpose. A scraper blade 65 is mounted along one edge of plate 58 for engaging and removing residual liquid from the applicator roll. The liquid deposited in trough 62 is applied to a sheet by rotating roll 56 (in a counterclockwise direction) to apply the liquid as a thin layer to the peripheral surface of the roll and advancing the sheet relative to and past the roll in the opposite direction in contact with the peripheral surface of the roll to transfer the liquid from the roll to the sheet. A pair of juxtaposed feed rolls 64 and 66 mounted above knife 50 are provided for advancing each section of the photosensitive sheet from between the knife and anvil upwardly toward the applicator roll, and guides 68 and 70 are provided on opposite sides of the path of movement of the sheet between the feed rolls for guiding the sheet along a path tangent with the portion of the peripheral surface of applicator roll 56 lying opposite trough 62. A backing roll 72 is provided mounted in juxtaposition with applicator roll 56 for guiding and supporting the sheet against the applicator roll together with means for rotating roll 72 for advancing the sheet upwardly against the applicator roll.

From the applicator roll the sheet being treated is moved upwardly between guides 74 into the nip of a pair of rolls 76 and 78 which serve to advance the sheet upwardly and, as described in the aforementioned application Ser. No. 456,423, function as a wringer to remove excess processing liquid from the surface of the sheet. A scraper blade 79 is mounted in engagement with roll 78 for removing processing liquid therefrom. Processing of the sheet requires that the sheet remain in a dark environment during a processing period of predetermined duration, and for this purpose, the apparatus includes means defining a path of predetermined length along which each sheet is advanced from between rolls 76 and 68 within the apparatus at a speed calculated to provide the necessary processing period. These means comprise a plurality of circular discs 80 mounted for rotation in spaced axial relation on a shaft 82, and a plurality of endless belts 84, each including a portion engaged around a portion of the periphery of one of discs 80, and a return portion supported on pulleys 86, 87, 88, and 90. A sheet 24 is advanced by rolls 76 and 78 upwardly into the nip between discs 80 and belts 84 at pulleys 86 and is advanced along a cylindrical path defined by the peripheries of discs 80 from pulleys 86 past pulleys 88 to the point at which belts 84 are tangent with the discs. The belts are advanced to rotate discs 80 in a counterclockwise direction and move the sheet gripped between the discs and belts along a circular path of about 230° around the peripheries of the discs and thence downwardly from engagement with the discs and through an opening 92 in the housing located beneath and adjacent pulleys 90, the sheets having a tendency to adhere to the belts until the belts are guided around pulleys 90. A plurality of narrow belts and discs are preferred to a single belt and drum in order to limit the area of contact betwen the sheet and the belts and thereby facilitate drying of the sheet and separation of the sheet from the belts.

The length of each area of sheet 24 processed should be approximately coextensive with the area exposed, and is controlled by cutting each section of the photosensitive sheet to the same length as the uncovered area of window 10, to effect a savings in the sheet material employed. The processing liquid may be supplied in a container 94 mounted in the apparatus adjacent lens 22 above mirror 30 and is dispensed in controlled quantities by a solenoid actuated valve 96 located above trough 62 and coupled by a conduit with container 94. The length of each section of sheet 24 is determined by the length of the sheet permitted to advance between knife 50 and anvil 52 prior to actuation of the knife to sever the sheet.

Knife 50 is preferably electrically controlled, e.g., by means such as a solenoid or relay, in turn controlled by a microswitch 100 mounted on shaft 82 between a pair of discs 80. Switch 100 includes an actuating lever 102 extending into the path of movement of sheet 24 (supported against the peripheries of the discs) in position to be engaged by the leading edge of each section of the sheet for closing the switch and actuating the knife. It will be seen that the length of each section of the photosensitive sheet is the length of the path of movement of the sheet from the knife and anvil to lever 102 and this can be varied by changing the position of the switch by rotating shaft 82 on which the switch is mounted. A sector shaped disc 104 is affixed to shaft 82 and extends through an opening 106 in the upper wall of the apparatus so as to be engageable manually for simultaneously controlling the position of the switch and the position of curtain 35. Cables 46 are coupled with pulleys 108 keyed to shaft 82 so that the length of each severed section of the sheet will correspond with the length of the exposed area thereof. Disc 104 may be calibrated with visible indicia representing positions of the disc for various lengths of copies to be produced.

It will be seen that the invention provides a simple and reliable exposure and processing system requiring that the operator rotate a single disc 104 to vary the length of the area of the photosensitive sheet exposed and the length of the section severed from the remainder of the sheet so that the length of the exposed area and severed section correspond.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing successive sections of a photosensitive sheet to produce images therein comprising, in combination:

exposure means for exposing successive areas of a photosensitive sheet, said exposure means being adjustable to any position over a predetermined range of positions to vary the lengths of said exposed areas;

processing means for treating successive sections of said sheet, each including an exposed area, with a liquid to form an image in each of said areas; and adjustable control means coupled with said exposure means and said processing means for varying the length of each of said sections treated with a liquid in proportion to the length of said exposed area of said each section.

2. Photographic apparatus as defined in claim 1 wherein said processing means include cutting means for severing each of said sections from the remainder of said sheet and said adjustable control means actuate said cutting means to sever said sheet at the ends of said sections.

3. Photographic apparatus for exposing and treating successive sections of a photosensitive sheet to produce a succession of sheets each including an image, said apparatus comprising, in combination:

exposure means for exposing successive areas of a photosensitive sheet, said exposure means being adjustable to any position over a predetermined range of positions to vary the lengths of said areas exposed; and processing means for severing successive sections of said photosensitive sheet, each including an exposed area, from the remainder of said sheet and treating each of said sections to produce a visible image therein;

said exposure means being coupled with said processing means for varying the length of said section to conform to the length of said exposed area thereof.

4. Photographic apparatus as defined in claim 3 wherein said exposure means are coupled with said means for severing said sheet to vary the length of each of said sections in conformity with the length of said exposed area of said each section.

5. Photographic apparatus as defined in claim 3 wherein:

holding means are included for locating successive sections of said sheet in position for exposure;

said means for severing said sheet include cutting means located adjacent the path of movement of said sheet from said holding means for severing said sheet adjacent the leading edge of an area thereof positioned for exposure; and said processing means include adjustable control means located in said path of movement of said sections in position to be engaged by the leading edge of each of said sections and actuate said cutting means to sever said sheet in response to engagement by said leading edge.

6. Photographic apparatus as defined in claim 5 wherein said exposure means are coupled with said adjustable control means to vary the distance along said path between said control means and said cutting means.

7. Photographic apparatus as defined in claim 3 wherein:

said exposure means include a curtain movable to vary the length of said area exposed; and said processing means include cutting means for severing said sheet and adjustable control means positioned to be engaged by the leading edge of each of said sections of sheet for actuating said cutting means when so engaged;

said curtain being coupled with said adjustable control means for moving said adjustable control means relative to said cutting means in response to changes in the position of said curtain.

8. Photographic apparatus for exposing and treating successive sections of a photosensitive sheet to produce a succession of image-containing sheets comprising, in combination:

holding means for locating successive sections of a photosensitive sheet in position for exposure;

image-forming means for producing an image on a section of said sheet located in position for exposure;

light-transmitting means for transmitting light from a subject being photographed to said image-forming means;

obturator means interposed between said light-transmitting means and said image-forming means for obscuring a portion of said light-transmitting means to prevent passage of light therethrough to said image-forming means, said obturator means being movable to any position over a predetermined range of positions to vary the length of the exposed area of said section of said sheet and the image formed by said image-forming means;

means providing a processing station for treating each of said sections of said photosensitive sheet following exposure thereof to produce a visible image therein;

cutting means for severing said each section, following treatment thereof, from the remainder of said sheet; and adjustable control means for actuating said cutting means, coupled with said obturator means for movement thereby to vary the length of said each section to conform to the length of said exposed area thereof.

9. Photographic apparatus as defined in claim 8 including:

means for moving each of said sections of said sheet leading edge first along a predetermined path from said holding means through said processing station;

said adjustable control means including an engagement member mounted in said path of movement of said sheet and being responsive to engagement by said leading edge of each of each of said sections for actuating said cutting means to sever said sheet at the trailing edge of said each section; and means for varying the position of said engagement member in said path relative to said cutting member in response to changes in the position of said obturator means.

10. Photographic apparatus as defined in claim 8 wherein said cutting means are electrically actuated, said obturator means comprise a movable curtain, and said adjustable control means include a switch for controlling flow of current to said cutting means, said switch being operated by engagement with said leading edge of each of said sections to energize said cutting means and being coupled with said curtain for movement thereby relative to said cutting means in said path.

11. Photographic apparatus for exposing and processing successive sections of a photosensitive sheet to produce a succession of sheets each including an image, said apparatus comprising, in combination:

first support means for positioning graphic material for exposure;

image-forming means for producing an image of an area of said graphic material at an exposure plane within said apparatus;

second support means for positioning successive sections of a photosensitive sheet at said exposure plane for exposure to light from said area of said graphic material, said second support means being adapted to position each of said sections with the leading edge thereof located closely adjacent the image of an edge of said area of said graphic material;

cutting means mounted adjacent said second support means for severing each of said sections from the next succeeding section of said sheet located by said second support means in position for exposure in said exposure plane;

drive means for advancing each of said sections subsequent to exposure thereof from said second support means past said cutting means;

indicating means mounted adjacent said first support means for indicating the length of said area of said graphic material, said indicating means being mounted for movement relative to said first support means into alignment with the opposite edge of said area of said graphic material to be exposed; and means coupling said indicator means to said drive means and said cutting means for stopping said drive means and actuating said cutting means to cut said each section from the remainder of said sheet closely adjacent the image of said opposite edge of said area of said graphic material as determined by the setting of said indicator means.

References Cited

UNITED STATES PATENTS

| | | | |
|---|---|---|---|
| 2,256,396 | 9/1941 | Luboshez | 88—24 |
| 3,282,192 | 11/1966 | Chen | 95—89 |
| 3,289,532 | 12/1966 | Baumgarten | 88—24 |

NORTON ANSHER, *Primary Examiner.*

G. M. HOFFMAN, *Assistant Examiner.*